(12) United States Patent
Kim

(10) Patent No.: US 7,372,521 B2
(45) Date of Patent: May 13, 2008

(54) DIRECT TYPE BACKLIGHT ASSEMBLY

(75) Inventor: Tae Hyuck Kim, Daejeon-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 547 days.

(21) Appl. No.: 11/023,466

(22) Filed: Dec. 29, 2004

(65) Prior Publication Data
US 2005/0219440 A1    Oct. 6, 2005

(30) Foreign Application Priority Data
Mar. 30, 2004    (KR) ...................... 10-2004-0021679

(51) Int. Cl.
*G02F 1/1335*    (2006.01)
(52) U.S. Cl. ........................ 349/64; 362/615
(58) Field of Classification Search ............ 349/61–64; 362/518, 615
See application file for complete search history.

(56) References Cited

U.S. PATENT DOCUMENTS

| | | | |
|---|---|---|---|
| 5,931,555 A * | 8/1999 | Akahane et al. ............ 362/613 |
| 6,989,873 B2 * | 1/2006 | Hua-Nan et al. ............. 349/64 |
| 7,133,092 B2 * | 11/2006 | Lee et al. ...................... 349/64 |
| 7,248,310 B2 * | 7/2007 | Mueller-Mach et al. ...... 349/71 |
| 2002/0015297 A1 | 2/2002 | Hayashi et al. |
| 2004/0001345 A1 | 1/2004 | Lee et al. |
| 2004/0004684 A1 | 1/2004 | Yang et al. |
| 2004/0169785 A1* | 9/2004 | You et al. ...................... 349/61 |

FOREIGN PATENT DOCUMENTS

| JP | 05-008175 A | 9/1993 |
|---|---|---|
| KR | 1020020067655 A | 8/2002 |
| KR | 1020030078529 A | 10/2003 |

* cited by examiner

*Primary Examiner*—David Nelms
*Assistant Examiner*—John Heyman
(74) *Attorney, Agent, or Firm*—Birch, Stewart, Kolasch & Birch, LLP

(57) ABSTRACT

A direct type backlight assembly includes at least one light lamp under a liquid crystal panel, having two substrates bonded with a liquid crystal layer therebetween. A light guide plate is positioned between adjacent light lamps. A reflective plate is under the light lamps and the light guide plate. At least one optical sheet covers an entire surface over the light guide plate. A case receives the above components. The backlight assembly prevents sagging of the optical sheets.

16 Claims, 5 Drawing Sheets

DIRECT TYPE BACKLIGHT ASSEMBLY

This application claims the benefit of the Korean Application No. 10-2004-0021679 filed on Mar. 30, 2004, which is hereby incorporated by reference.

BACKGROUND OF THE INVENTION

1. Field of the Invention

The present invention relates to backlights of liquid crystal display devices and to liquid crystal display devices in general. More particularly, the present invention relates to a direct type backlight assembly and to a liquid crystal display device for preventing formation of an optical wrinkle caused by heat from a light lamp.

2. Discussion of the Background Art

Recently, research in the area of flat display devices has been focusing on Liquid Crystal Display Devices (LCDs), Field Emission Display Devices (FEDs), Electro-luminescence Display Devices (ELDs), and Plasma Display Panels (PDPs).

In the field of flat display devices, applications pertaining to LCDs are expanding to notebook PC's, desktop monitors, and liquid crystal TVs, because of LCD features of great contrast ratio, suitability for gradation display and motion picture display, and low power consumption.

Referring to FIG. 1, the LCD illustrated therein is provided with an upper substrate 101 having a color filter layer 112 formed thereon for displaying colors, a lower substrate 102 having switching devices for changing an orientation of liquid crystal molecules, and a liquid crystal layer 100 between the upper and lower substrates 101 and 102.

Besides the color filter layer 112, the upper substrate 101 is also provided with a black matrix 111 for blocking a leakage of light, and a first common electrode 113 which is a first electrode for applying a voltage to the liquid crystal layer 100, and besides the thin film transistor 121 (which is a switching device), the lower substrate 102 is also provided with pixel electrode 122 which is a second electrode for receiving a signal from the thin film transistor and applying a voltage to the liquid crystal layer 100.

There are spacers 115 between the upper and lower substrates 101 and 102 for maintaining a fixed gap between the two substrates, and a sealant 116 is provided at a periphery of the substrates for preventing leakage of the liquid crystal material outside of the substrates.

However, since the LCD is a non-emissive type display device which emits no light from itself, a separate external light source is required for illumination. Particularly, in a case of a transmissive LCD, a separate illuminating device, i.e., a backlight assembly, is required in the rear of an LCD panel for emitting and guiding light without fail.

There are a variety of backlight assemblies in use, and they range from a direct type to a light guide plate type. The light guide plate type is provided with a linear light source in tube form, such as a fluorescent lamp (e.g., a hot cathode, or a cold cathode type) at a side of the liquid crystal display panel, for projecting light from the light lamp to an entire surface of the liquid crystal display panel by using a light guide plate, and the direct type is provided with light lamps mounted under the liquid crystal display panel for diffusing light from the light lamps as the light is diffused by a diffuser sheet between the light lamps and the liquid crystal display panel.

However, the light guide plate type is not competitive because of difficult sourcing of components, and the fabrication process has a problem of light leakage caused by close fitting of lamps and the lamp housing, and a drop in luminance caused by loss of light through the light guide plate.

In order to solve these problems, a direct type of light assembly is suggested, in which the light lamps are mounted under the liquid crystal panel, for providing a higher luminance and a more uniform light distribution. A direct type light source is preferable for a display in which uniform luminance is required.

In a case of the direct type, efforts for providing a high luminance backlight assembly has been an object of intense research, particularly directed to the development of a backlight assembly including a plurality of light lamps, or one curved lamp mounted under the display screen.

A background art direct type backlight assembly will be described with reference to the attached drawings. FIG. 2 illustrates a disassembled perspective view of a background art backlight assembly, FIG. 3 illustrates a section across a line I-I' in FIG. 2, and FIG. 4 illustrates a section of a backlight assembly (for use in describing problems of the background art backlight assembly).

Referring to FIGS. 2 and 3, the background art direct type backlight assembly is provided with a plurality of light lamps 51 for emitting light, a reflective plate 52 for converging the light from the light lamps 51 to a display part of the liquid crystal display panel, optical sheets having a diffuser sheet 55, a prism sheet 56 and a protection sheet 57, and a case 53 for fastening and supporting various components inclusive of the light lamps 51.

In addition to supporting the backlight assembly, the case 53 also supports the liquid crystal display panel above the backlight assembly. There is a bezel part comprised of stainless steel on an outside of the case 53 fitted to an edge of the liquid crystal panel to cover a periphery of the screen, excluding an effective area where a picture is displayed thereon.

Optical sheets are provided for preventing the light lamps from showing on a display surface of the liquid crystal display panel, and providing a light source with a uniform luminance distribution, and includes the diffuser sheet 55, the prism sheet 56, and the protection sheet 57.

The diffuser sheet 55 is formed of a PET (Polyethylene Terephthalate) sheet of approximately 130 µm thick having diffusing particles coated on both sides, and the prism sheet 56 is formed of lenses of approximately 170 µm thick with an apex angle of approximately 90°.

The light lamp is a Cold Cathode Fluorescent Lamp (CCFL) provided with a glass tube having a fluorescent material coated on an inside circumferential surface, and a discharge gas of a mixed inert gas or mercury Hg injected therein, and electrodes at opposite ends connected to power lines 59 and 59a for applying power thereto for driving the lamp, thereby turning it on with an external power source.

The backlight assembly is also provided with a lamp guide 60 fastened to an inside of the case 53 for holding a light lamp 51 with a gap from the reflective plate 52, and support sides 58 fastened to opposite ends of the light lamp 51 for holding and supporting the light lamp 51.

The lamp guide 60 holds the light lamp, and prevents the optical sheets from sagging, and the support sides 58 fixes the light lamp and seats the diffuser sheet 55 thereon.

The backlight assembly provides the light from the light lamp 51 to an information display surface through the diffuser sheet 55, the prism sheet 56, the protection sheet 57, etc. in succession.

However, the background art direct type backlight assembly has problems.

That is, in a case of a monitor or a TV LCD that requires a high luminance, many light lamps are required, which generate heat. As shown in FIG. 4, the optical sheets (particularly the diffuser sheet 55) can expand and sag downward, or form a wrinkle due to heat from the light lamps 51. The wrinkle refracts a path of the light, which results in a dark or bright part on the screen thereby causing a brightness of the screen to be non-uniform.

SUMMARY OF THE INVENTION

It is an object of the invention to provide a direct type backlight assembly and a liquid crystal display device for preventing formation of an optical wrinkle caused by heat from a light lamp.

Accordingly, the present invention is directed to a direct type backlight assembly that substantially obviates one or more of the problems due to limitations and disadvantages of the background art.

The present invention provides a direct type backlight assembly in which heat from light lamps is minimized, to prevent optical sheets from wrinkling.

Further, the present invention provides a direct type backlight assembly in which not only a number of light lamps, but also a number of lamp guides are reduced, for reducing fabrication costs significantly.

Additional features and advantages of the invention will be set forth in the description which follows, and in part will be apparent to those having ordinary skill in the art upon examination of the following, or may be learned from practice of the invention. The objectives and other advantages of the invention will be realized and attained by the structure particularly pointed out in the written description and claims hereof, as well as the appended drawings.

To achieve these objects and other advantages and in accordance with the purpose of the present invention, as embodied and broadly described herein, the direct type backlight assembly comprises at least two lamps under a liquid crystal display panel and at least one light guide plate between adjacent two lamps of the at least two lamps. Further, a liquid crystal display device is provided comprising a direct type backlight assembly with the above-mentioned features.

Thus, the number of light lamps needed in the device is reduced. This is achieved by providing one or more light guide plates arranged between respective two adjacent light lamps. Thus, the light emitted from the lamps is used in a more efficient manner, since the light is partially guided by the light guide plate. According to the invention, the lamps emit light at least partially directly onto the liquid crystal display panel. In other words, the lamps are provided facing the liquid crystal display panel, so that a kind of direct type backlight assembly is provided.

Preferably, the direct type backlight assembly may further comprise a reflective plate under the at least two lamps and the at least one light guide plate. By taking this measure, light may reflected from the reflective plate to the liquid crystal display panel. Thus, the light emitted from the lamps may be used in a further improved and more efficient manner.

The at least one light guide plate preferably has a thickness smaller than a distance between the reflective plate and the optical sheets. When optical sheets are sagging due to heat from the lamps, the light guide plate provided in a small distance below the optical sheets may be supported by the light guide plate, thus deformation of the optical sheets is prevented and the display quality of the LCD is improved.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF PREFERRED EMBODIMENTS

Reference will now be made in detail to preferred embodiments of the present invention, examples of which are illustrated in the accompanying drawings.

Figure 1:
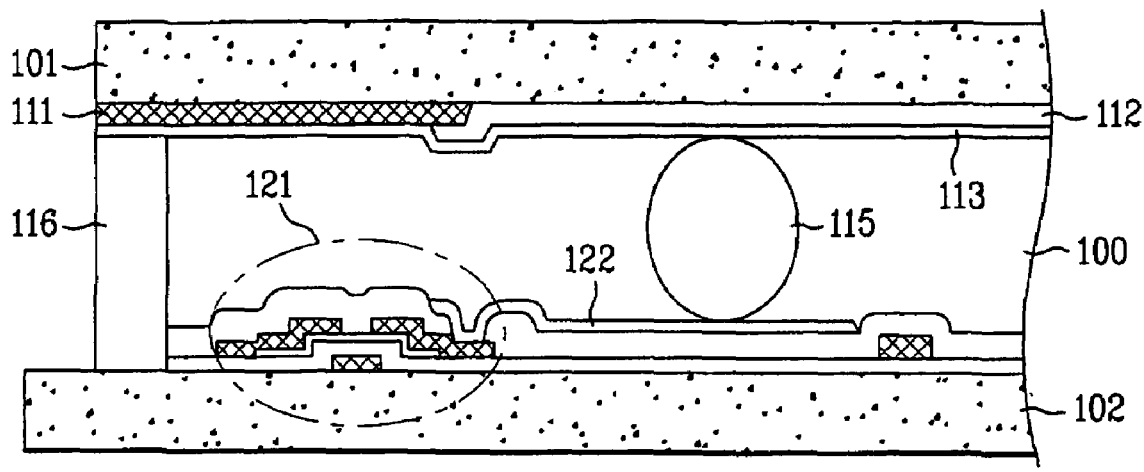
FIG. 1 illustrates a section of a background art liquid crystal display panel.
Figure 2:
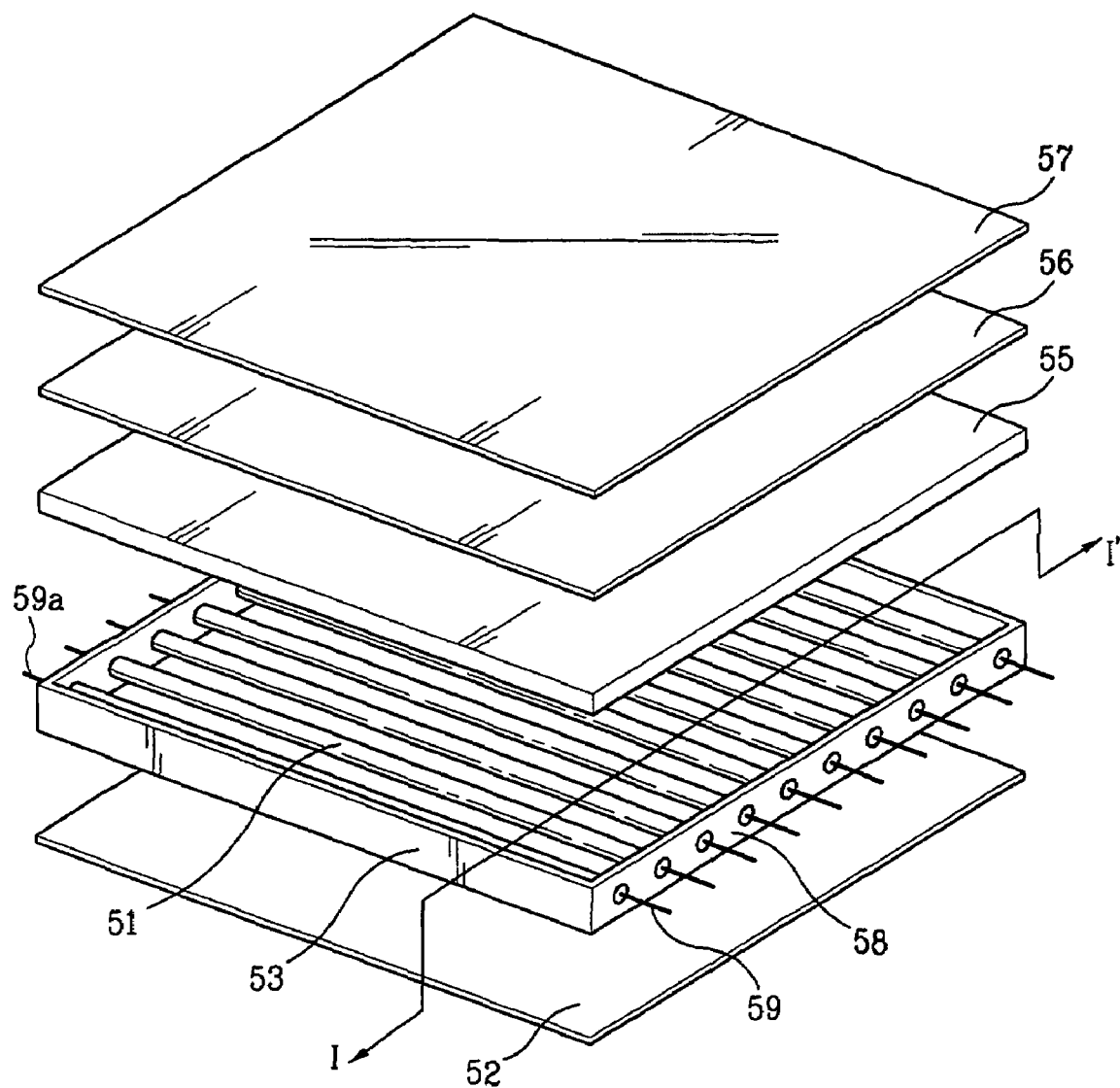
FIG. 2 illustrates a disassembled perspective view of a background art backlight assembly.
Figure 3:
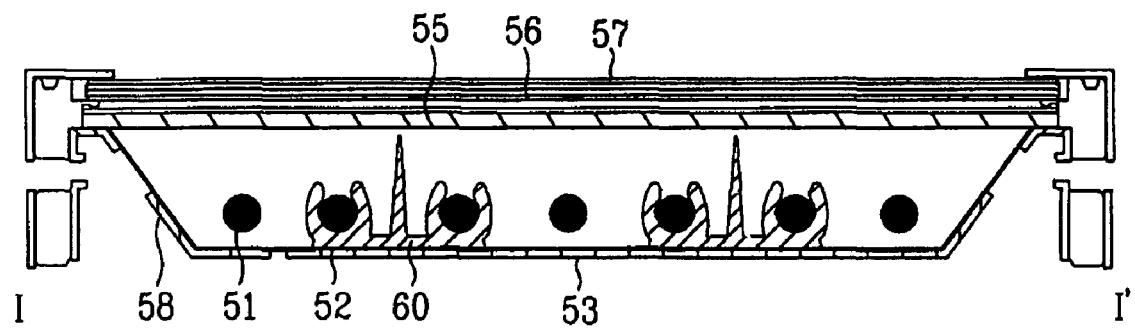
FIG. 3 illustrates a section of the backlight assembly across a line I-I' in FIG. 2.
Figure 4:
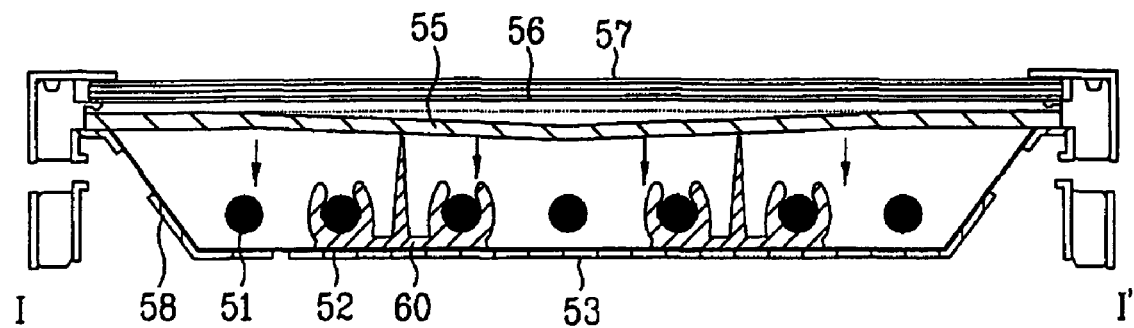
FIG. 4 illustrates a section of a backlight assembly for describing problems of the background art backlight assembly.
Figure 5:
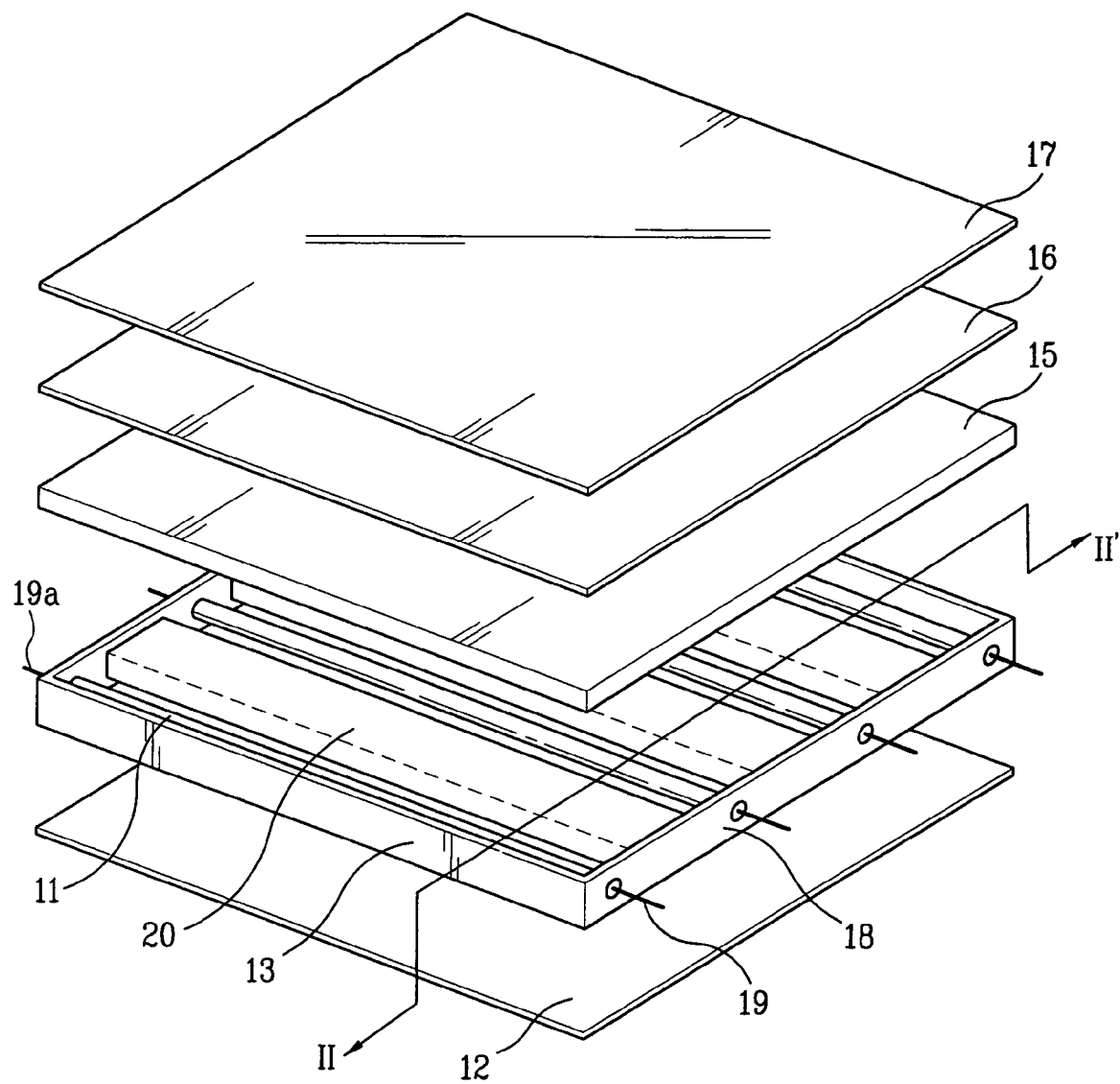
FIG. 5 illustrates a section of a liquid crystal display panel in accordance with a preferred embodiment of the present invention.
Figure 6:
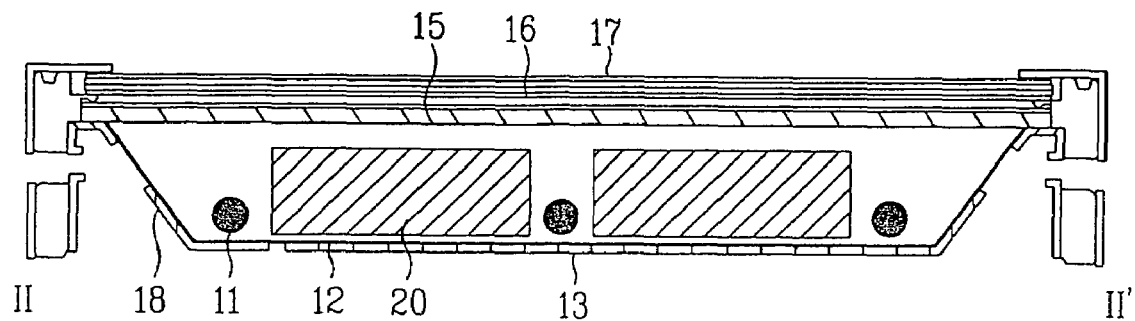
FIG. 6 illustrates a section of the backlight assembly across a line II-II' in FIG. 5.
Figure 7:
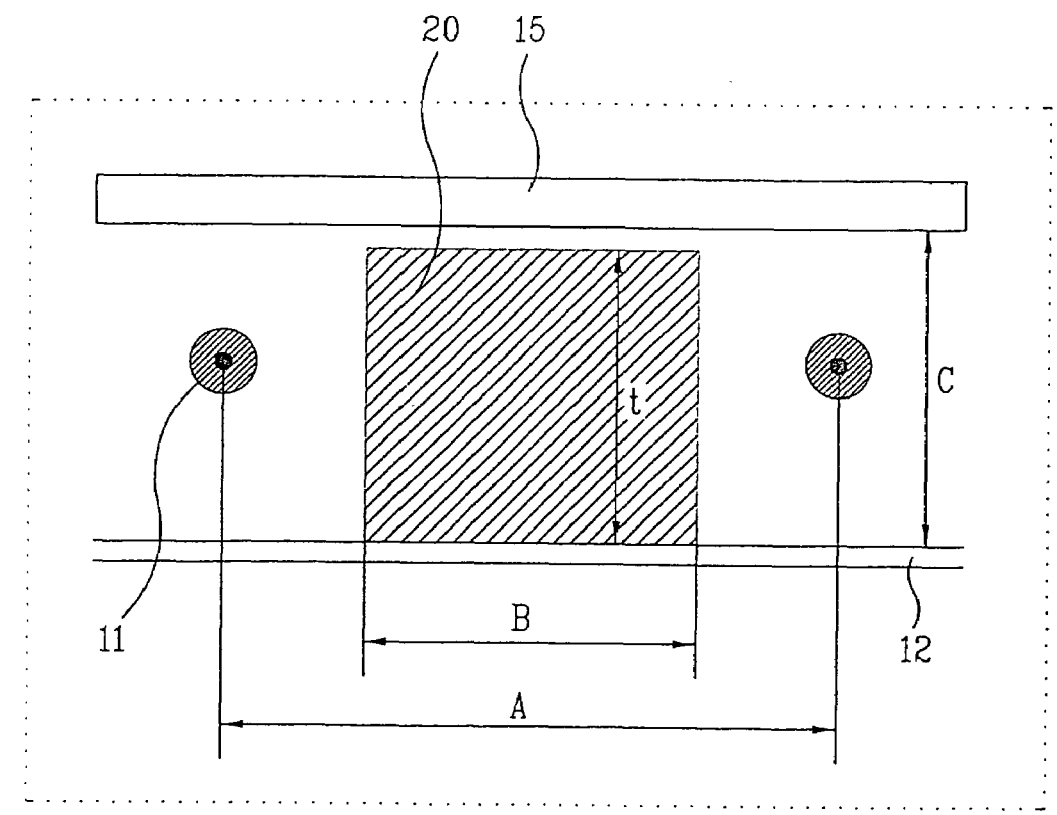
FIG. 7 illustrates a configuration of light lamps and light guide plates in accordance with a preferred embodiment of the present invention.

FIG. 5 illustrates a section of a liquid crystal display panel in accordance with a preferred embodiment of the present invention, FIG. 6 illustrates a section of the backlight assembly across a line II-II' in FIG. 5, and FIG. 7 illustrates a configuration of light lamps and light guide plates in accordance with a preferred embodiment of the present invention.

Referring to FIGS. 5 and 6, the direct type backlight assembly includes tubular light lamps 11, such as fluorescent lamps, arranged at regular intervals for emitting light, a light guide plate 20 between adjacent light lamps 11 for directing light from the light lamp toward the liquid crystal panel and adjusting the quantity and direction of the light, a reflective plate 12 under the light guide plate 20 for reflecting light leaked from a bottom of the light guide plate toward the liquid crystal display panel uniformly, optical sheets of a diffuser sheet 15, a prism sheet 16, a protection sheet 17 on an entire surface over the light guide plate 20 (in succession), a case 13 for receiving and holding the above components, and support sides 18 fastened to the case 13 for fixing a plurality of the light lamps 11 and the light guide plate 20.

The light lamp 11 has a discharge gas, such as neon Ne, argon Ar, mercury Hg, or the like injected therein, a fluorescent material coated on an inside circumferential surface thereof, and power lines 19 and 19$a$ at both ends for supplying power to turn on the light lamp. The power lines 19 and 19$a$ pass through the support sides 19, and are connected to an external driving circuit.

The light lamp 11 is mounted at a height approximately 4~6 mm from the reflective plate 12 without being in contact therewith for enabling light emission from an entire surface. The light lamp 11 is inserted in and held at holes of the support sides 18.

At least one light guide plate 13 is arranged along a length direction of the light lamps 11, wherein at least one light guide plate 20 is arranged between adjacent light lamps 11. The light lamps may be arranged alternately with one of the light lamps 11 or two of the light lamps 11, depending on a size of a liquid crystal model or liquid crystal display device. For example, ends of the light lamps 11 may be partially overlapped to form staggered rows of light lamps, such as two or three rows, depending on the size of the LCD.

For reference, the light guide plate 20 is formed of an acryl resin and the like, in a form of a thin film, and may have a milky white scattering pattern (not shown) printed on an underside surface thereof for light scattering.

If the light guide plates 20 are arranged on a part where the light lamps 11 are normally arranged, a number of light lamps 11 can be reduced. Therefore, there is a reduction of heat from light lamps, thereby preventing sagging of the optical sheets caused by heat.

The use of the light guide plate which (adjusts a light quantity) compensates for the drop in luminance caused by the reduced number of light lamps.

Referring to FIG. 7, it is preferred that a width 'B' of the light guide plate 20 is smaller than a distance 'A' between adjacent light lamps 11, and a thickness t of the light guide plate 20 is smaller than a distance 'C' between the reflective plate 12 and the optical sheets. The light guide plate 20 has a length smaller than a length of the adjacent lamps 11.

The optical sheets include the diffuser sheet 15, the prism sheet 16, and the protection sheet 17, wherein the diffuser sheet 15 diffuses the light from the light lamp 11 uniformly, the prism sheet 16 on the diffuser sheet 15 converges the light diffused at the diffuser sheet and directs it to the liquid crystal panel, and the protection sheet 17 is on the prism sheet 16 for protecting the optical sheets.

Since the diffuser sheet 15 is seated and held under the guide of the support sides 18, and is supported on the light guide plates 20, sagging of the diffuser sheet 15 caused by heat is prevented. Also, the light guide plates 20 and the diffuser sheet 15 are spaced a distance apart for prevention of a Moiré phenomenon.

The necessity of the lamp guide in the background art provided for supporting the light lamps 11 and the diffuser sheet is reduced because of the reduced number of light lamps and the arrangement of the light guides. Therefore, the lamp guides may be either reduced in number or totally dispensed with.

The direct type backlight assembly of the present invention has the following advantages. First, the arrangement of the light guide plate or plates between the light lamps permits a reduction in the number of light lamps which reduces total heat generation by the light lamps. The heat reduction reduces the risk of forming wrinkles or a sagging of the optical sheets, which cause poor outer appearance and projection of the form of the light lamp on a screen of a display. Moreover, refraction of a light path caused by a wrinkle in the optical sheets is prevented. Therefore, screen luminance is uniform, and picture quality is good.

Second, the arrangement of the light guide plate or plates in place of the light lamps permits a reduction in a number of light lamps along with the number of lamp guides for supporting the light lamps. The reduced number of parts leads to a reduction in process costs. Third, the supporting of the optical sheets with the light guide plate or plates permits dispensing with the lamp guide required for supporting the optical sheets in the background art. Thus, a direct type backlight assembly of high efficiency can be provided.

It will be apparent to those skilled in the art that various modifications and variations can be made in the present invention. Thus, it is intended that the present invention covers the modifications and variations of this invention which fall within the scope of the appended claims and their equivalents.

What is claimed is:

1. A backlight assembly, comprising:
   at least two lamps under a liquid crystal display panel;
   at least one light guide plate between adjacent lamps of the at least two lamps, and
   a reflective plate under the at least two lamps and the at least one light guide plate,
   wherein the at least one light guide plate has a length smaller than a length of the adjacent lamps, and has a milky white scattering pattern printed on an underside surface thereof for light scattering, and
   wherein the at least two lamps are mounted at a height approximately 4~6 mm from the reflective plate without being in contact therewith for enabling light emission from an entire surface.

2. The backlight assembly according to claim 1, further comprising a case for receiving the reflective plate.

3. The backlight assembly according to claim 1, further comprising optical sheets over the at least one light guide plate and the at least two lamps.

4. The backlight assembly according to claim 3, wherein the at least one light guide plate has a thickness smaller than a distance between the reflective plate and the optical sheets.

5. The backlight assembly according to claim 1, further comprising optical sheets over the at least one light guide plate and the at least two lamps.

6. The backlight assembly according to claim 5, wherein the optical sheets include at least one of a diffuser plate, a prism sheet and a protection sheet.

7. The backlight assembly according to claim 5, wherein the at least one light guide plate has a thickness smaller than a distance between a reflective plate under the at least two lamps and the optical sheets.

8. The backlight assembly according to claim 1, wherein the at least one light guide plate has a width smaller than a distance between the adjacent lamps.

9. A liquid crystal display device comprising:
   an upper substrate having a color filter layer formed thereon;
   a lower substrate having switching devices formed thereon;
   a pixel electrode on the lower substrate;
   a liquid crystal layer between the upper substrate and the lower substrate; and
   a backlight assembly comprising:
      at least two lamps under the lower substrate,
      at least one light guide plate between adjacent lamps of the at least two lamps, and
      a reflective plate under the at least two lamps and the at least one light guide plate,
   wherein the at least one light guide plate has a length smaller than a length of the adjacent lamps, and has a milky white scattering pattern printed on an underside surface thereof for light scattering, and
   wherein the at least two lamps are mounted at a height approximately 4~6 mm from the reflective plate without being in contact therewith for enabling light emission from an entire surface.

10. The liquid crystal display device of claim 9, wherein the backlight assembly further comprises a case for receiving the at least two lamps, the at least one light guide plate and the reflective plate.

11. The liquid crystal display device according to claim 9, further comprising optical sheets over the at least one light guide plate and the at least two lamps.

12. The liquid crystal display device according to claim 11, wherein the at least one light guide plate has a thickness smaller than a distance between the reflective plate and the optical sheets.

13. The liquid crystal display device of claim 9, wherein the backlight assembly further comprises optical sheets over the at least one light guide plate and the at least two lamps.

14. The liquid crystal display device of claim 13, wherein the optical sheets include at least one of a diffuser plate, a prism sheet and a protection sheet.

15. The liquid crystal display device of claim 13, wherein the at least one light guide plate has a thickness smaller than a distance between a reflective plate under the at least two lamps and the optical sheets.

16. The liquid crystal display device of claim 9, wherein the at least one light guide plate has a width smaller than a distance between the adjacent two lamps.

* * * * *